United States Patent
Mitsui

(10) Patent No.: US 7,768,661 B2
(45) Date of Patent: Aug. 3, 2010

(54) INFORMATION PROCESSING APPARATUS, CONTROL METHOD THEREFOR, COMPUTER PROGRAM, AND COMPUTER-READABLE STORAGE MEDIUM

(75) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1072 days.

(21) Appl. No.: 11/190,968

(22) Filed: Jul. 28, 2005

(65) Prior Publication Data

US 2006/0023244 A1 Feb. 2, 2006

(30) Foreign Application Priority Data

Jul. 30, 2004 (JP) .............................. 2004-224582
Jul. 5, 2005 (JP) .............................. 2005-196814

(51) Int. Cl.
G06F 3/12 (2006.01)
G06K 15/00 (2006.01)

(52) U.S. Cl. ...................... 358/1.13; 358/1.14; 358/1.15

(58) Field of Classification Search ....... 358/1.13–1.18, 358/501, 1.9; 382/229

See application file for complete search history.

(56) References Cited

U.S. PATENT DOCUMENTS

| 5,960,113 A * | 9/1999 | Even et al. ................... 382/229 |
| 2002/0171857 A1* | 11/2002 | Hisatomi et al. ........... 358/1.13 |
| 2003/0053107 A1* | 3/2003 | Kizaki et al. ................ 358/1.13 |
| 2003/0079063 A1* | 4/2003 | Iida et al. ......................... 710/8 |
| 2003/0103224 A1* | 6/2003 | Johnson et al. ............ 358/1.13 |
| 2003/0231336 A1* | 12/2003 | Kim .......................... 358/1.15 |

FOREIGN PATENT DOCUMENTS

| EP | 0 893 754 A1 | 1/1999 |
| EP | 893754 A1 * | 1/1999 |
| JP | 2003-162394 | 6/2003 |

* cited by examiner

*Primary Examiner*—James A Thompson
(74) *Attorney, Agent, or Firm*—Fitzpatrick, Cella, Harper & Scinto

(57) ABSTRACT

A method of processing data to be printed and print setting information used to print the data includes a detection step of detecting uninterpretable information from the print setting information, a transmission step of transmitting the uninterpretable information detected in the detection step, an acquisition step of acquiring interpretable information which is sent back in response to transmission of the uninterpretable information transmitted in the transmission step, and a creation step of creating print setting information by using the information acquired in the acquisition step.

18 Claims, 19 Drawing Sheets

FIG. 4

```xml
<psf.JobTicket Version="1"
    xmlns:psf="http://schemas.printer.co.jp/printing/printschemaframework"
    xmlns:psk="http://schemas.printer.co.jp/printing/printschemakeywords"
    xmlns:xsi="http://www.w3.org/2001/XMLSchema-instance"
    xmlns:xs="http://www.w3.org/2001/XMLSchema"
    xmlns:ns1="http://www.privatenamespace1.com"
    xmlns:ns2="http://www.privatenamespace2.com">

<psf.Feature name="psk:MediaSize">
    <psf.Option name="CustomMediaSize">
        <psf.Property name="psk:FeedOrientation">
            <psf.Value xsi:type="xs:string">LongEdgeFirst</psf.Value>
        </psf.Property>
    </psf.Option>
</psf.Feature>

<psf.Feature name="psk:DocumentNUp">
    <psf.Feature name="psk:PresentationDirection">
        <psf.Option name="psk:RightBottom" />
    </psf.Feature>
    <psf.Feature name="ns2:Poster">
        <psf.Option name="ns2:Off" />
    </psf.Feature>
</psf.Feature>

<psf.ParameterInit name="psk:PageMediaSizeMediaSizeX">
    <psf.Value xsi:type="xs:integer">10000</psf.Value>
</psf.ParameterInit>

<psf.ParameterInit name="psk:PageMediaSizeMediaSizeY">
    <psf.Value xsi:type="xs:integer">10000</psf.Value>
</psf.ParameterInit>

<psf.ParameterInit name="psk:PageCopyCount">
    <psf.Value xsi:type="xs:integer">1</psf:Value>
</psf.ParameterInit>

<psf.ParameterInit name="ns2HalfTones">
    <psf.Option name="ns2:Gradation" />
</psf.ParameterInit>

</psf.JobTicket>
```

FIG. 7

```
<psf:Feature name="psk:Finishing">
    <psf:Feature name="ns2:DocumentStapling">
        <psf:Option name="ns2:TOP_LEFT">
    </psf:Feature>
</psf:Feature>
```

FIG. 8

```
<xsl:template match="ns2.DocumentStapling">
  <psf:Option name="GANON:Staple">
  <psf:Value xsi:type="xs:bool"><xsl:choose>
     <xsl:when test=".='OFF' ">false</xsl:when>
     <xsl:otherwise>true</xsl:otherwise>
  </xsl:choose></psf:Value>
  </psf:Option>

<psf:Option name="GANON:StaplePosition">
  <psf:Value xsi:type="xs:string"><xsl:choose>
     <xsl:when test=".='TOP_LEFT' ">UPPER_LEFT</xsl:when>
     <xsl:when test=".='BOTTOM_LEFT' ">LOWER_LEFT</xsl:when>
     <xsl:when test=".='TOP_RIGHT' ">UPPER_RIGHT</xsl:when>
     <xsl:when test=".='BOTTOM_RIGHT' ">LOWER_RIGHT</xsl:when>
     <xsl:when test=".='LEFT_DOUBLE' ">LEFT_W</xsl:when>
     <xsl:when test=".='TOP_DOUBLE' ">TOP_W</xsl:when>
  </xsl:choose></psf:Value>
  </psf:Option>
</xsl:template>
```

FIG. 9

```
<psf:Feature name="psk:Finishing">
    <psf:Option name="GANON:Staple">
        <psf:Value xsi:type="xs:bool">true</psf:Value>
    </psf:Option>
    <psf:Option name="GANON:StaplePosition">
        <psf:Value xsi:type="xs:string">UPPER_LEFT</psf:Value>
    </psf:Option>
</psf:Feature>
```

FIG. 10

```
<psf:Feature name="ns2:Inserter">
    <psf:Value xsi:type="xs:bool">true</psf:Value>
</psf:Feature>
```

FIG. 11

```
<psf:Feature name="GANON:unkown01">
    <psf:Feature name="ns2:Inserter">
        <psf:Value xsi:type="xs:bool">true</psf:Value>
    </psf:Feature>
    <psf:Option name="GANON:Selection">
        <psf:Value xsi:type="xs:string">InsertionUnit</psf:Value>
        <psf:Value xsi:type="xs:string">InsertingSheet</psf:Value>
    </psf:Option>
</psf:Feature>
```

F I G. 12

```
<xsl:template match="ns2:Inserter">
    <psf:Option name="GANON:InsertingSheet">
    <psf:Value xsi:type="xs:bool"><xsl:choose>
        <xsl:when test=".='OFF' ">false</xsl:when>
        <xsl:otherwise>true</xsl:otherwise>
    </xsl:choose></psf:Value>
    </psf:Option>
</xsl:template>
```

FIG. 13

```
<SOAP-ENV:Envelope
    Xmlns:SOAP-ENV="http://schemas.xmlsoap.org/soap/envelope/"
    SOAP-ENV:encodingStyle="http://schemas.xmlsoap.org/soap/encoding/">
    <SOAP-ENV:Header>
        <q:QueristInfo,xmlns:q="http://www.ganon.co.jp/schemas/soapheader"
            SOAP-ENV:actor="http://schemas.ganon.co.jp/soap/actor/printerdriver"
            SOAP-ENV:mustUnderstand="1">
    </SOAP-ENV:Header>
    <SOAP-ENV:Body>
    <SOAP-ENV:Body>

<psf:JobTicket>
        -------------
        </psf:JobTicket>

</SOAP-ENV:Body>
</SOAP-ENV:Envelope>
```

INFORMATION PROCESSING APPARATUS, CONTROL METHOD THEREFOR, COMPUTER PROGRAM, AND COMPUTER-READABLE STORAGE MEDIUM

FIELD OF THE INVENTION

The present invention relates to a technique of generating, from information created by an application program, print data to be output to a printing apparatus.

BACKGROUND OF THE INVENTION

To print a document created by the user from an application program running on a computer such as a PC, print data of the document is transferred to a printing-associated processing program such as a printer driver via an OS (Operating System). The printer driver transmits dedicated instruction data to a printer apparatus, thereby printing the document. Data transferred from the application program to the printer driver are roughly classified into two: print setting information which describes a format and input/output settings compatible with the printer, and drawing data for reproducing an actual document.

The ranges of setting values designated by print settings are limited to only functions and ranges which can be designated by the printer, but the application program does not know all the functions of the printer. An interface which is provided to the application program by the operating system and used to designate print settings is limited to basic functions which are considered to be supported by every printer, for example, designation of the paper size and sheet feed cassette, setting of the delivery tray, setting of single-/double-sided printing, and monochrome/color setting. The printer driver provides only an interface which informs the application of ranges of these basic functions that can be designated by the printer. However, functions of the printer are not limited to them, and the printer driver must extend print settings in order to use various functions of the printer apparatus, such as a detailed color matching function and many finishing functions including stapling.

The application uses one area to save print settings, and this area is divided by contents into a basic area which is provided by the operating system and an extension area which can be freely extended by the printer driver. To extend print settings, the printer driver stores unique settings in the extension area. Since data in the extension area cannot be directly known by the application program, various functions of the printer are set by prompting the user to set them with a user interface or application programming interface (API) unique to the printer driver.

Conventional formats for saving print settings are a DEVMODE data structure (structure which holds information on the initialization and environment of a device) which is ensured in a memory area, and a job ticket (print ticket) for saving data in the XML format of a markup language which describes data with tags. The DEVMODE data structure is a binary data structure, and printer drivers of respective vendors can relatively freely arrange data in the extension area. Due to the freely extendable structure, however, the extension area cannot be understood by printer drivers except one which internally knows the specifications of the extension area. Since a job ticket which saves data in the XML format has a text data structure, the printer driver can acquire all data of the job ticket by reading tags one by one. However, the basic and extension areas are discriminated by assigning different name spaces. If a name space has the same tag name but is unknown to the printer driver, the printer driver cannot understand a function of the printer that corresponds to acquired data.

As described above, settings in the extension area change depending on the vender of a printer driver or the printer apparatus. To attain optimal settings desired by the user, the user must perform setting every printing by using the user interface or application programming interface of a printer driver which is unique to the printing apparatus and is output before printing. Although how to hold print settings changes depending on the application, an application which saves print settings in a document inherits print settings created by a printer driver of another vendor. Of print settings created by a printer driver of another vendor, setting information in the basic area is inherited, but setting information unique to the printer apparatus in the extension area is not inherited. Thus, in the worst case, print processing fails unless the user performs setting again.

To solve this problem, there is proposed a mechanism of performing print processing by issuing an instruction to a printer driver capable of reading data from the extension area, and complementing data on the basis of setting information in the basic area (e.g., Japanese Patent Laid-Open No. 2003-162394). According to this method, print settings dedicated to respective controllable printer drivers are held, and print settings dedicated to a printer driver necessary for a printer used to print are applied. If print settings dedicated to a necessary printer driver are not held, print settings are created again via the application programming interface of the printer driver. This mechanism can be implemented because setting information in the basic area contains the device name of a printer in print settings.

If an application holds a plurality of types of print settings but does not have print settings dedicated to the printer driver of a printer which actually prints, all pieces of information in the extension area that are used to set various printer functions cannot be set by only setting information in the basic area. Only half-finished settings are stored in the extension area, and in some cases, all pieces of setting information in the extension area are not reflected, and only the initial values of the printer driver are used. In creating a plurality of types of print settings, a printer driver which is dedicated to a printer and finally output does not always exist. If no dedicated printer driver exists, print settings must be done again via the user interface or application programming interface in printing. In resetting, since the application programming interface is unique to each printer driver, an application cannot use the interface of a printer driver of an unknown vendor and cannot set information in the extension area. It is difficult for the user to understand which actually set functions are inherited and which functions are not. Functions in the extension area that are added as needed and correspond to a new printer of each vendor cannot be followed. The user cannot grasp print settings used to execute print processing, and makes settings again for a printer driver which is actually output.

SUMMARY OF THE INVENTION

The present invention has been made to solve at least one of the above problems, and has as its object to provide a mechanism which allows a printer driver or printing apparatus to interpret print setting information that is set in another printing system and cannot be interpreted by the printer driver or printing apparatus.

To solve the above problems, for example, a method according to the present invention has the following steps.

That is, as an example of one aspect, there is disclosed a method of processing data to be printed and print setting information used to print the data, comprising a detection step of detecting uninterpretable information from the print setting information, a transmission step of transmitting the uninterpretable information detected in the detection step, an acquisition step of acquiring interpretable information which is sent back in response to transmission of the uninterpretable information transmitted in the transmission step, and a creation step of creating print setting information by using the information acquired in the acquisition step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing an example of a "job ticket" structure according to the embodiment;

FIG. 7 is a view showing some of name spaces in the extension area (private area) of a job ticket created using an unknown printer driver;

FIG. 8 is a view showing an example of only a part which is extracted from XSLT data of the dictionary database and pertains to an unknown name space according to the embodiment;

FIG. 9 is a view showing an example of a job ticket obtained by applying XSLT in FIG. 8 to the job ticket in FIG. 7 and converting the job ticket into a known name space according to the embodiment;

FIG. 10 is a view showing an example of part of the private area of the job ticket that is extracted using an unknown printer driver according to the embodiment;

FIG. 11 is a view showing an example of a job ticket which lists candidates for an unknown function that are generated by the Web service of a server according to the embodiment;

FIG. 12 is a view showing an example of XSLT which is created by the Web service on the basis of a conversion result by an InsertingSheet function selected by the user via the printer driver in accordance with the job ticket in FIG. 11;

FIG. 13 is a view showing an example of a SOAP message to be transmitted from the printer driver to the Web service according to the embodiment;

DETAILED DESCRIPTION OF THE PREFERRED EMBODIMENT

A preferred embodiment of the present invention will be described in detail below with reference to the accompanying drawings.

Figure 1:
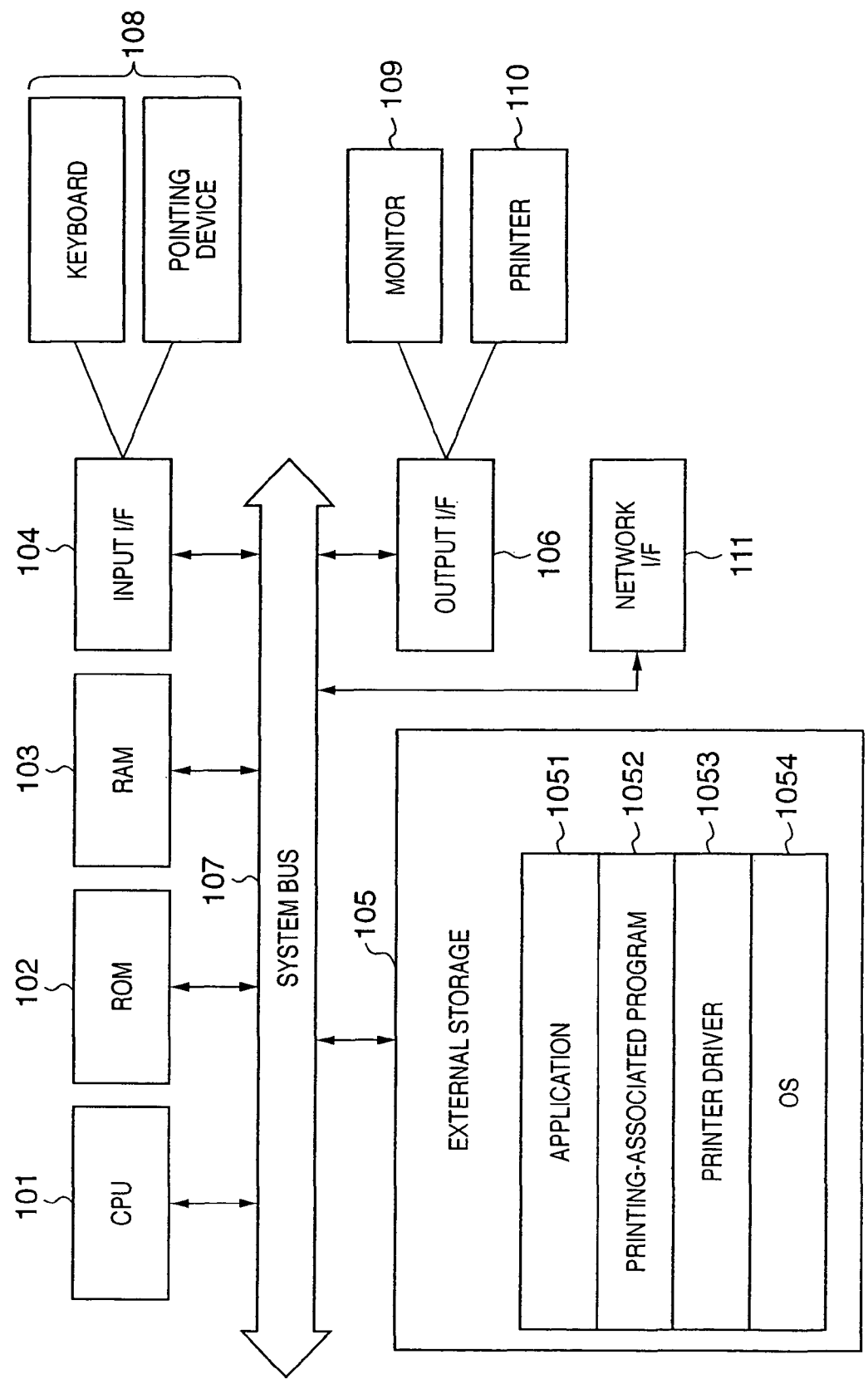
FIG. 1 is a block diagram showing a system including a computer according to an embodiment.

FIG. 1 is a block diagram showing a print processing system according to the embodiment of the present invention. The present invention can be applied to even a single function, a system comprised of a plurality of devices, and a system which is connected via a network such as a LAN or WAN and performs processing, unless otherwise specified.

In the embodiment, a structured document includes structured documents such as an XML document, and a tag means all identifiers which make it possible to recognize a data structure in a structured document in analysis, i.e., what meaning data of the structured document has and on which layer the data is located in the data structure of the structured document.

FIG. 1 is a block diagram showing a system using a general-purpose information processing apparatus such as a general personal computer (PC).

When the apparatus is powered on, a CPU 101 loads an OS (Operating System) from an external storage (generally a hard disk drive) 105 to a RAM 103 in accordance with a boot program stored in a ROM 102 connected to a bus 107, and activates the OS. After the activation, various menus of the OS are displayed on a monitor 109 (CRT or liquid crystal display device) connected to an output I/F 106. At the same time, information from an input device 108 made up of pointing devices such as a keyboard and mouse® can be accepted via an input I/F 104. When the user inputs an instruction with the input device 108, an application program 1051 (its type is arbitrary) stored in the external storage 105 is executed. After the application program 1051 is activated, various editing processes are done by interactive operation based on the display of the monitor 109 and instruction inputs from the input device 108. When a print instruction is input, a printing-associated program 1052 and printer driver 1053 are activated to generate print data and output it to a printer 110 via the output I/F 106. Communication between the printer 110 and the PC can use any I/F. Typical examples of the I/F are a parallel I/F available from Centronics Data Computer, a USB, and network connection (by wire or radio).

Figure 2:
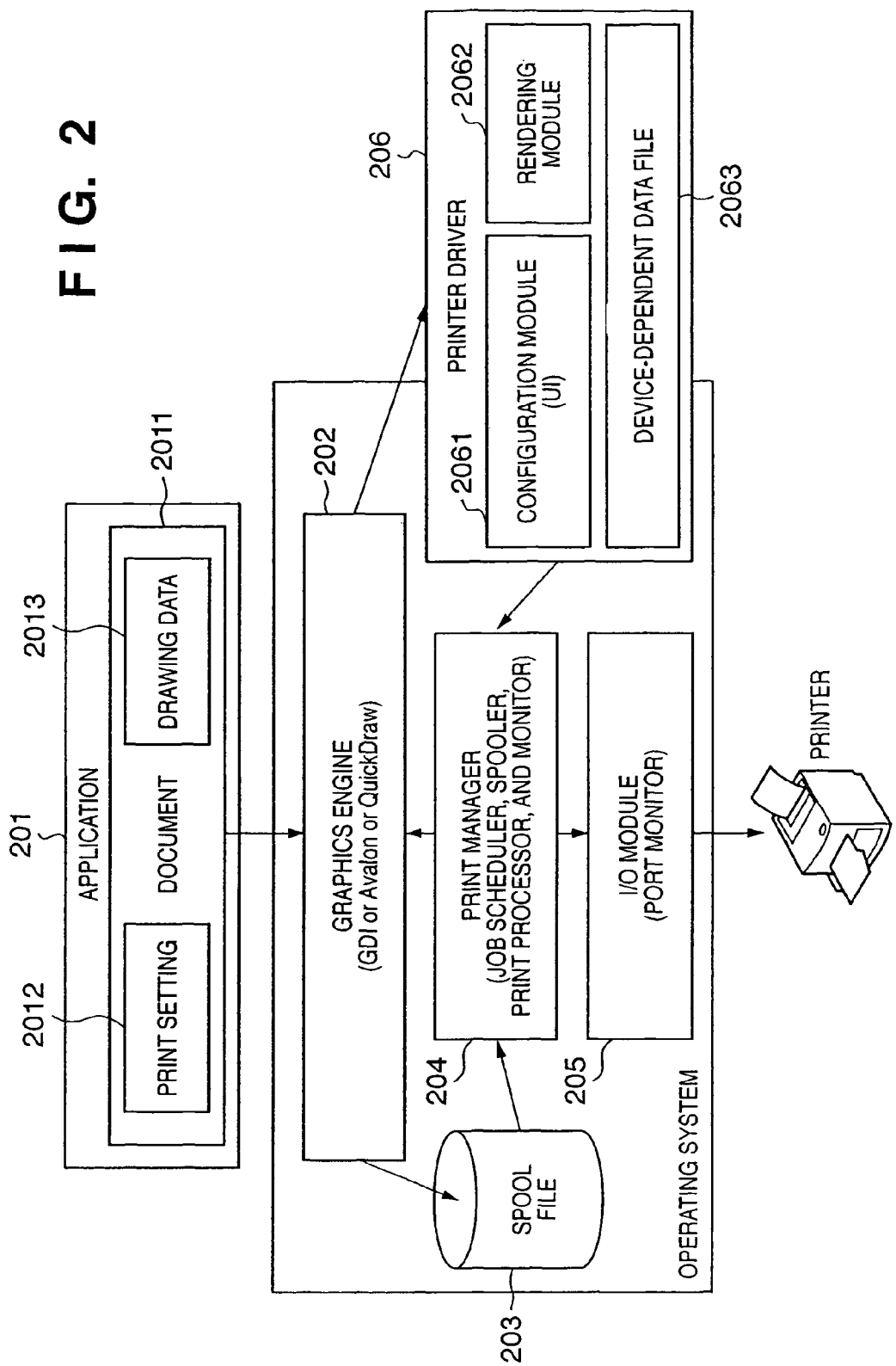
FIG. 2 is a view showing a program configuration in print processing by the computer according to the embodiment.

FIG. 2 shows a print processing system which represents the connection between the application program, the OS, and the printer driver.

The user uses the input device 108, and executes print processing for a created document 2011 via the GUI of an application program 201 that is displayed on the monitor 109. When the print processing is executed by the user, the application 201 understands print operation by the user, selects, on the basis of print settings 2012 of the document and drawing data 2013 of document contents, a printer driver 206 corresponding to a printer which executes printing, and notifies the operating system of print processing. The operating system performs drawing to a spool file 203 and drawing to the designated printer driver 206 via a graphics engine 202. The printer driver converts the data into a data language interpretable by the printer, and a print manager 204 manages the schedule of print processing by each application. When the printer is in a status "ready for reception", the print manager 204 transmits print job data to a printer 207 via an I/O module 205. As a result, printing is executed.

The initial values of the print setting information 2012 of the document are created by a configuration module 2061 of the printer driver. By using the user interface of an application or printer driver, the print settings are so changed as to obtain a final print result desired by the user. Print setting information can take two formats: one is a DEVMODE structure which is a data structure of a binary data format and the other is a job ticket which is XML text data of a markup language using a tag. The format changes depending on the specifications of the printer driver or operating system.

Figure 3:
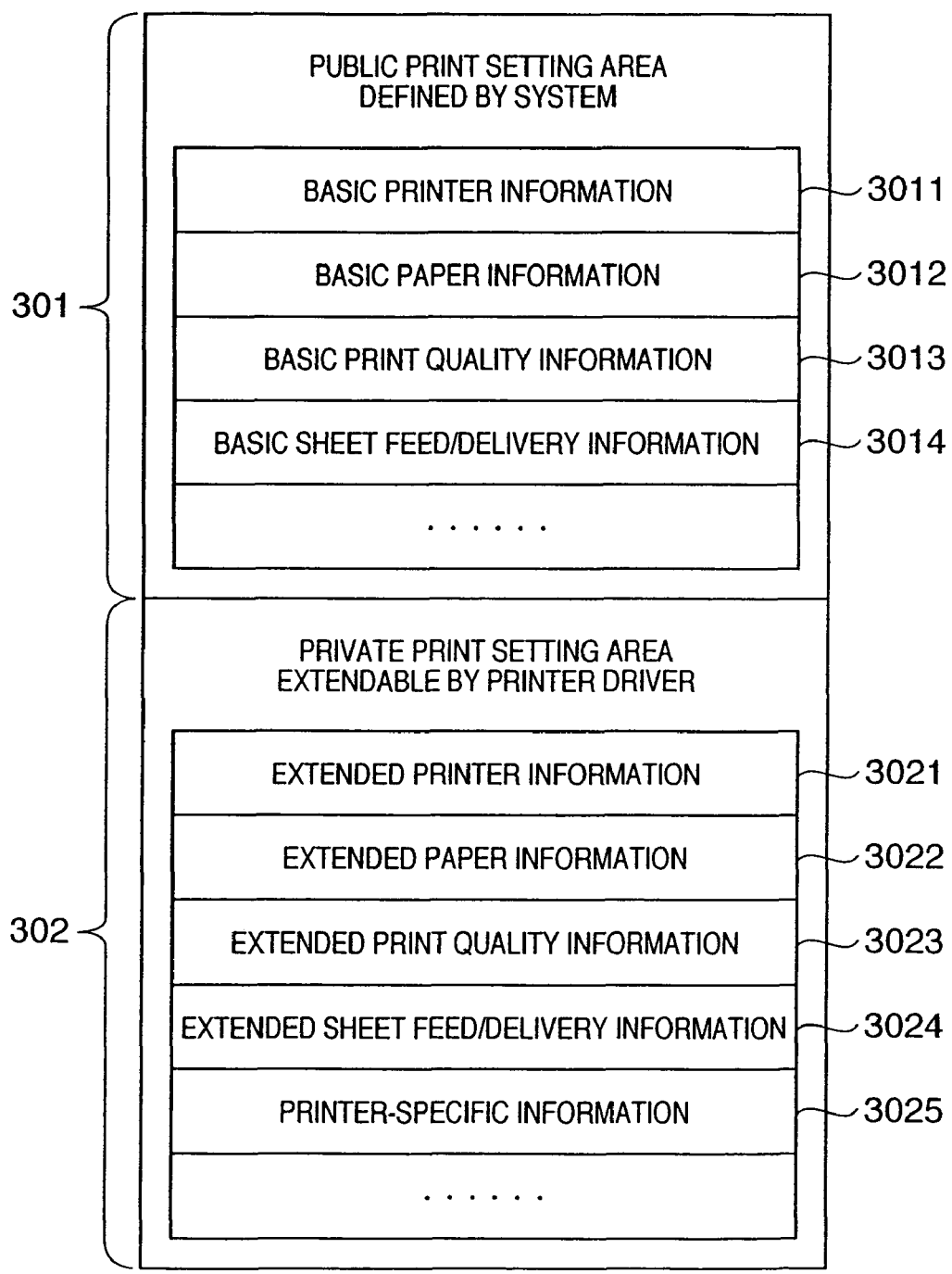
FIG. 3 is a view showing the structure of print setting information in a structure "DEVMODE" of a binary format.
Figure 15:
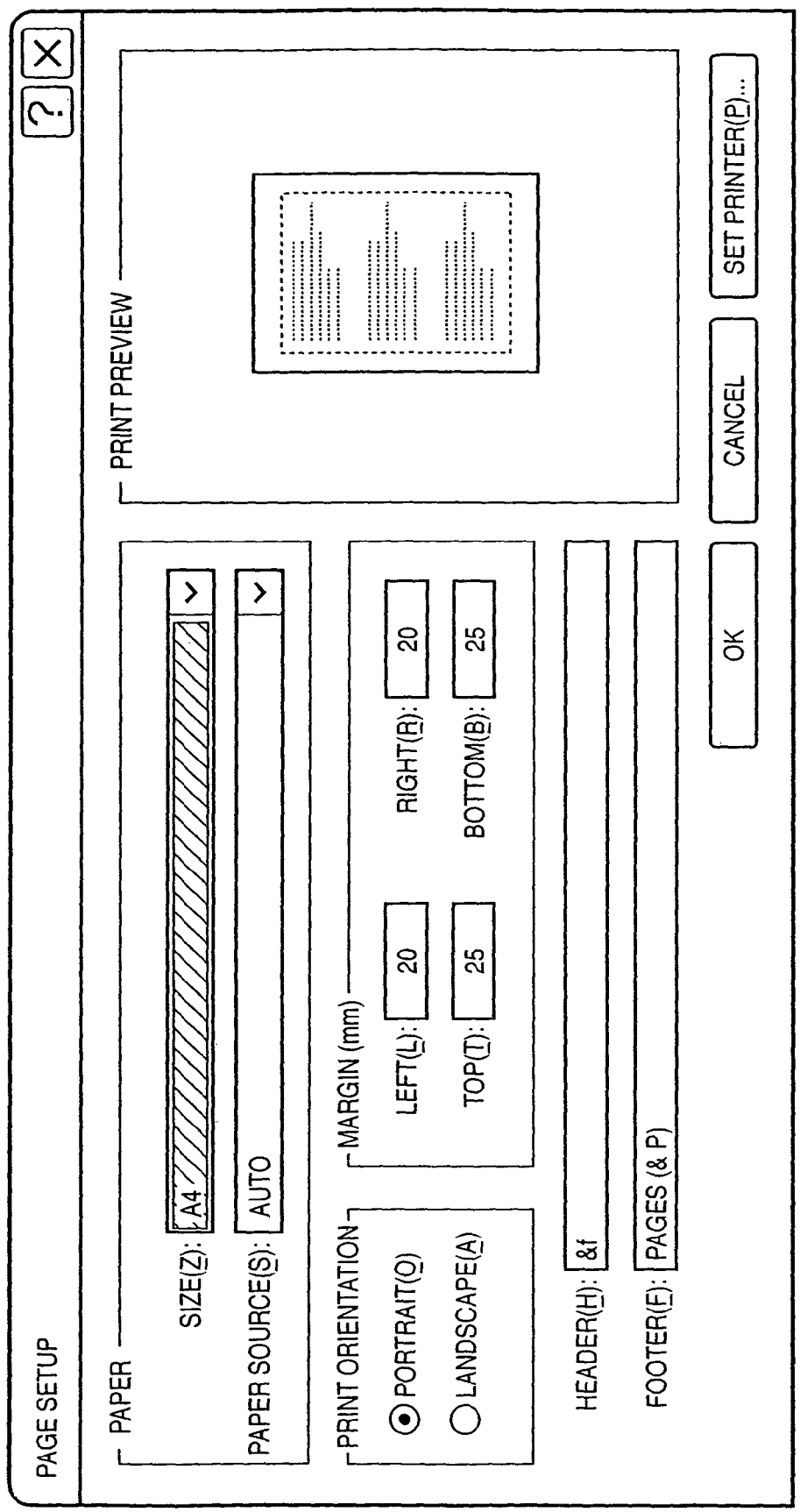
FIG. 15 is a view showing a user interface which is provided by an operating system or application and used to change print settings in the public area (basic area) according to the embodiment.
Figure 16:
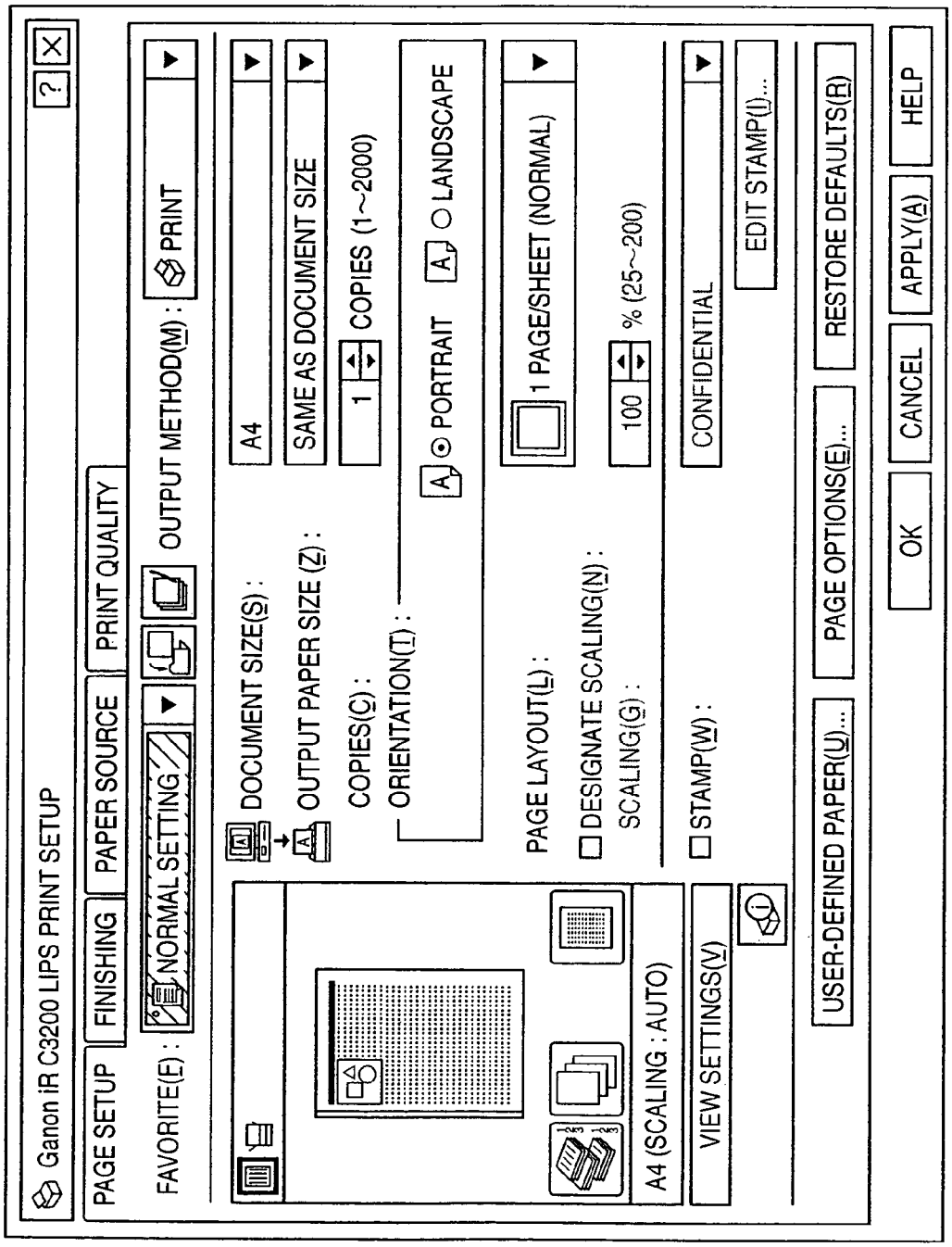
FIG. 16 is a view showing a user interface which is provided by the printer driver and displayed to change print settings in the private area (extension area) according to the embodiment.

FIG. 3 is a view showing the data structure of the DEVMODE structure. The DEVMODE structure is roughly divided into two setting areas: one is a public area 301 where common basic information defined by the operating system is set, and the other is a private area 302 which can be freely extended by a printer driver installed in each printer. The meaning of information in the public area 301 is widely laid open to the public as the format of the operating system, and settings in the public area 301 can be changed by any application. Settings in the public area 301 can be designated from the page setting dialog (FIG. 15) of the application. To the contrary, the private area 302 allows freely extending data, and thus can be set by only a printer driver which has been used to extend data. For this reason, the configuration module of the printer driver provides a user interface (FIG. 16), and prompts the user to perform print settings in the extension area via the user interface.

The public area of the DEVMODE structure includes basic printer information 3011 which stores the device name and the memory size of the entire structure, paper information 3012 which stores the paper size, width, height, and the like, print quality information 3013 which stores color/monochrome setting, resolution, and the like, and sheet feed/delivery information 3014 which stores a cassette used to feed paper, the delivery order, and the like. The private area stores items which cannot be held by basic information in the public area, for example, a printer-specific function 3025, middleware functions, and more detailed data of contents held in basic information.

Similar to the DEVMODE structure, the job ticket (or print ticket) includes public and private areas. However, these areas of the job ticket which is described in the XML format are not divided by a boundary, unlike the DEVMODE structure. These areas are discriminated by a mechanism called a name space which divides a job ticket into partitions in the internal structures of tags. This mechanism complies with the description rule of the XML format, the partition between descriptions or the like can be easily determined, and interpretation processing is easier than that for the DEVMODE structure.

FIG. 4 is a view showing the structure of a general job ticket. A name space is designated by each prefix tag, and a tag having no prefix is processed as a description which does not belong to a name space. The prefix is attached before the colon (:) mark, and described like "psf:Feature". The job ticket in FIG. 4 has six name spaces, and these name spaces have different roles. A psf name space is a print schema framework which defines the framework of the job ticket. In order to provide a structure which establishes a job ticket, basic tags such as Feature, Option, and Value are defined. Feature is a function including device attributes, job format settings, and other related features. Option is an accessory to the function, Value is an element value, and ParameterInit sets an initial value at the same time as the definition of the element value. A psk name space defines the keyword of a job ticket in the public area. Concrete keywords are MediaSize which designates the paper size, DocumentNUp which designates nUP setting for setting a plurality of pages on one page, and PageCopyCount which sets the number of copies to be printed. The psf name space and psk name space are laid open to the public as schemata by the operating system, and an application can freely arrange data on the basis of the definition. An xsi name space and xs name space are generally defined as the standards of XML schemata. The xsi name space defines the built-in attribute and instance of the XML schema, and the xs name space defines the default attribute of the XML schema. An ns1 name space and ns2 name space are uniquely extended by an unknown printer driver, and cannot be directly interpreted by the printer driver described in the embodiment.

The arrangement of the apparatus, the software configuration in print processing, and print setting information according to the embodiment have been described. Features of the embodiment will be explained in more detail.

Prior to the description, assume that there are two personal computers (PC-A and PC-B), a printer driver PRDRV-A is installed in PC-A, and a printer driver PRDRV-B (printer driver 206 according to the embodiment) is installed in PC-B. The same application program is installed in PC-A and PC-B, and has a function of saving a document file which sets an extension area for print setting information.

A case in which a document file created by PC-A is copied into PC-B and printed via a network and portable memory medium will be considered.

Figure 17:
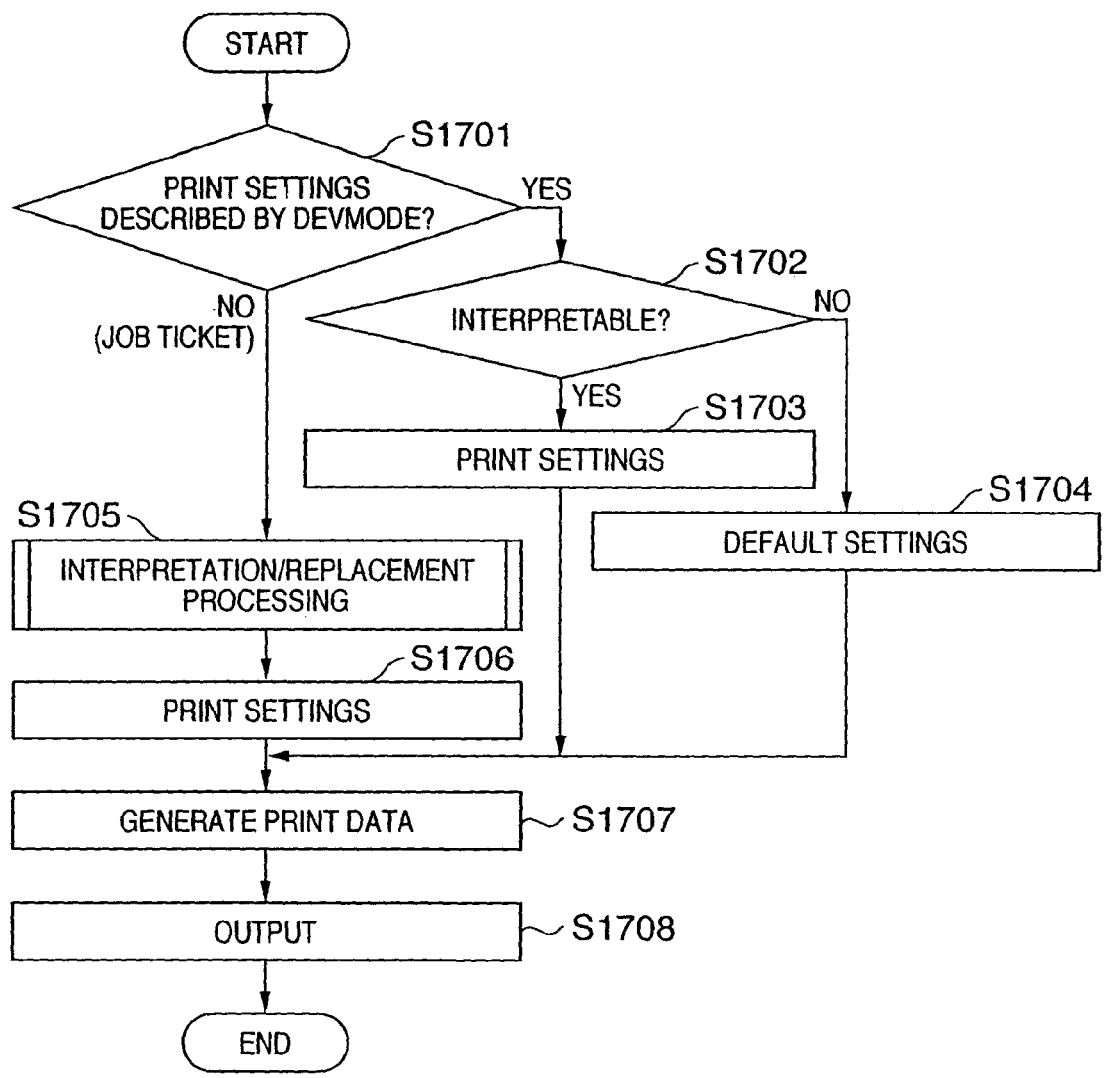
FIG. 17 is a flowchart showing the overall process sequence of the printer driver according to the embodiment.

FIG. 17 shows processing by the printer driver PRDRV-B (printer driver 206) when an application in PC-B designates execution of print processing.

In step S1701, it is determined whether print setting information is a DEVMODE description or job ticket description. If the print setting information is determined to be a DEVMODE description, the flow advances to step S1702 to determine whether the DEVMODE description can be interpreted. The printer driver 206 in the embodiment has the latest version of the same printer language, and supports older versions. Hence, this determination is done by checking matching with a DEVMODE description of an older version. If the DEVMODE description is determined to be interpretable, the flow advances to step S1703 to perform print settings in accordance with the contents of the DEVMODE description. If it is determined that the DEVMODE description is uninterpretable, i.e., the print setting information is a DEVMODE description by another vender, the determination is substantially impossible. In step S1704, print settings are initialized to default ones by the configuration module 2061 of the printer driver PRDRV-B (printer driver 206) of the embodiment.

If the print settings are determined in step S1701 to be described by a job ticket, the flow advances to step S1705. In step S1705, descriptions in the job ticket are interpreted, and if necessary, name space replacement processing is performed (details of which will be described later). In step S1706, print settings are made.

After print settings are made on the basis of print setting information in the above way, the flow advances to step S1707 to generate print data on the basis of the determined print setting information and drawing data (data which is transferred from an application and is to be printed). In step S1708, the generated print data is output. If NO in step S1701, the flow may advance to step S1705.

Figure 5:
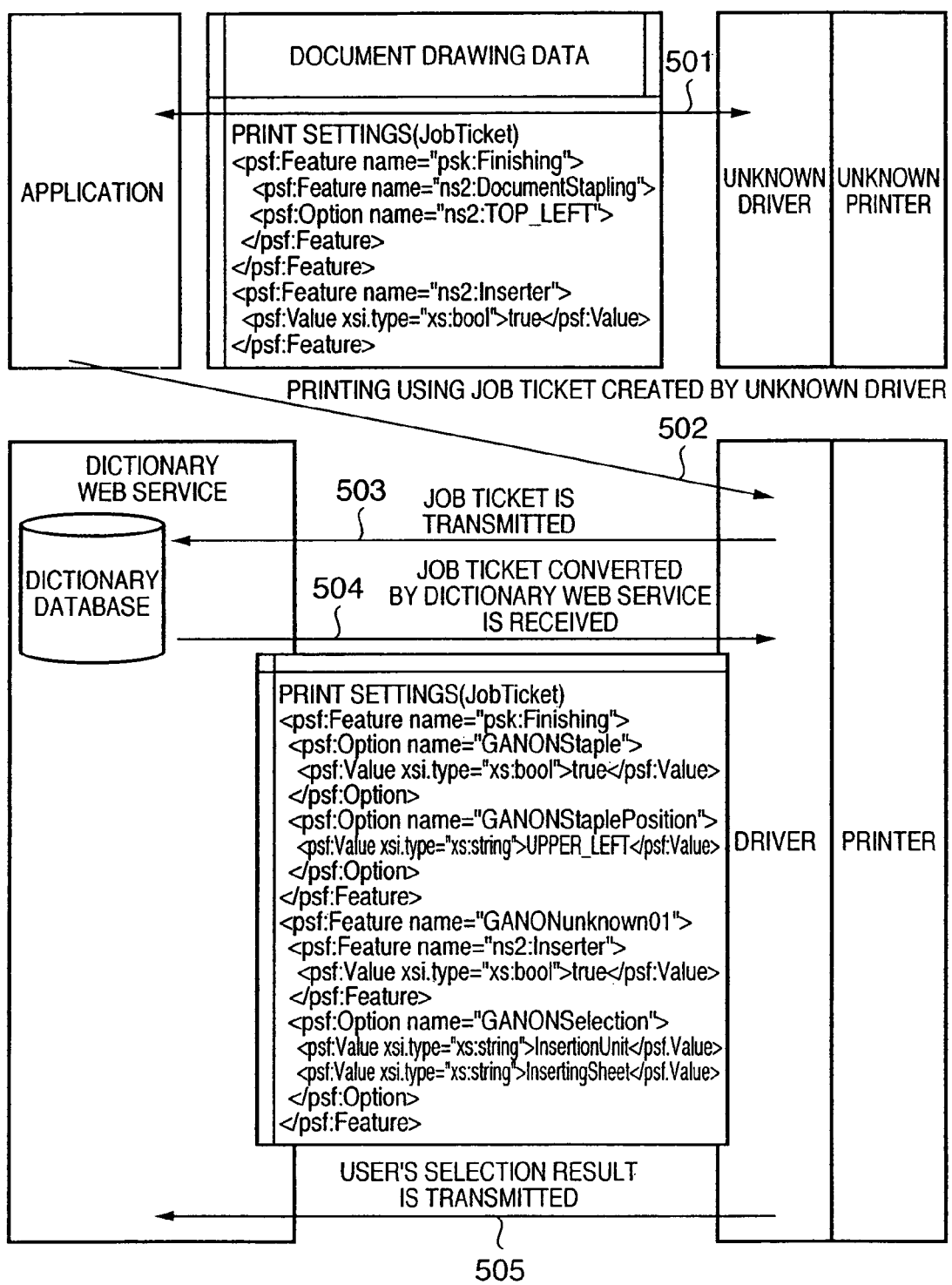
FIG. 5 is a view showing a mechanism of handling a job ticket, including cooperation between a printer driver and a dictionary database according to the embodiment.
Figure 6:
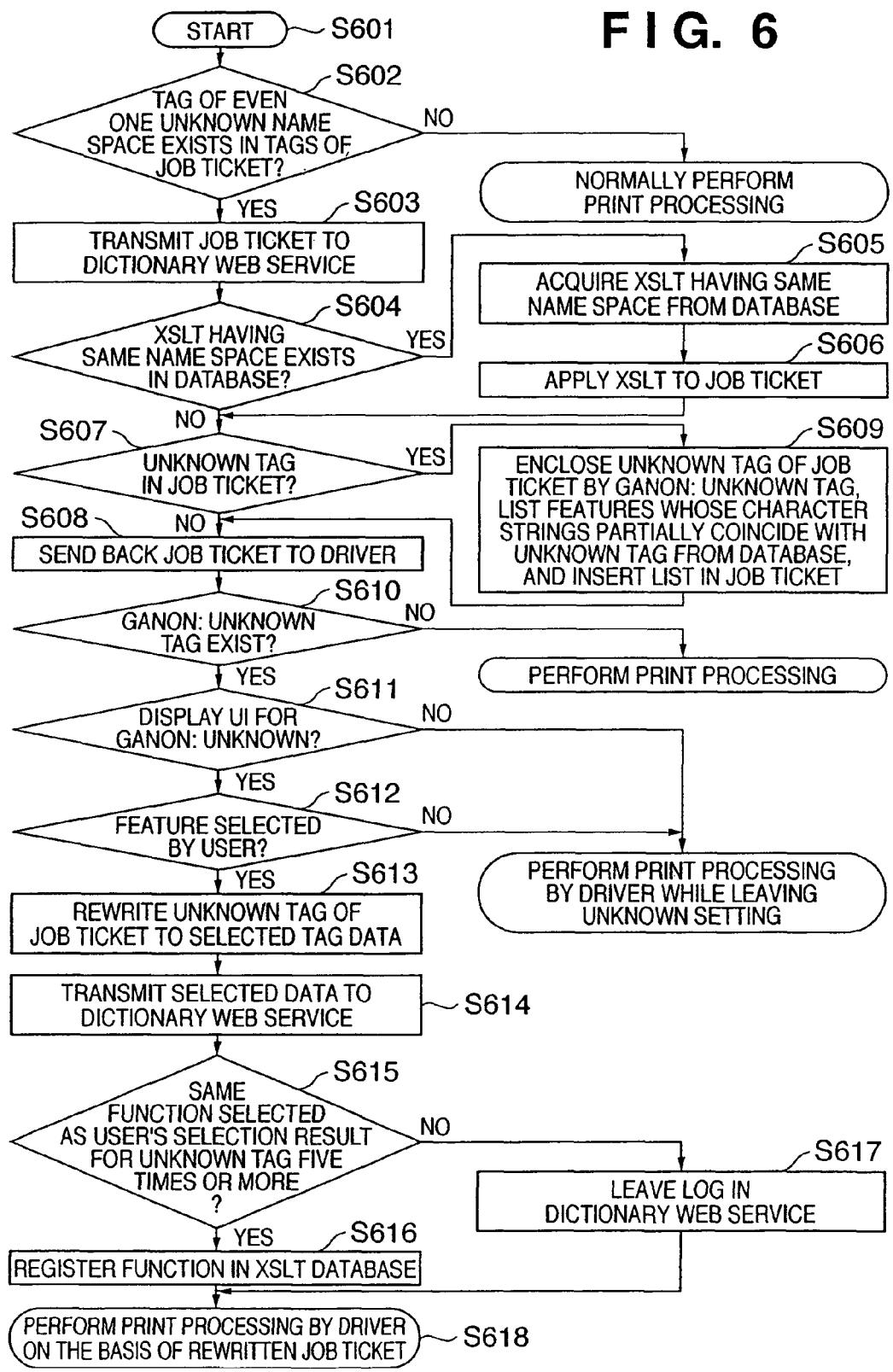
FIG. 6 is a flowchart showing job ticket conversion processing according to the embodiment.

Details of step S1705 will be described. FIG. 5 is a view showing an overview of the embodiment, and FIG. 6 is a flowchart for explaining details of step S1705.

For descriptive convenience, assume that a job ticket contains a description based on a printer driver (driver of another vender or manufacturer) unknown to the printer driver 206 according to the embodiment. More specifically, a job ticket transferred from an application is generated for an unknown driver and unknown printer (501).

The job ticket contains job tickets in FIGS. 7 and 10, and a unique function of the unknown driver is generated with a name space prefix "ns2". Using this job ticket as print settings, print processing starts for a printer driver dedicated to a printer which is to actually prints (502).

The printer driver 206 according to the embodiment can understand the psk and psf name spaces of the public area (basic area) and a name space "GANON" assigned by the printer driver 206 to a unique function in the private area (extension area). A job ticket received from an application for print processing contains the tag of the name space "ns2" generated by the unknown driver. The printer driver according to the embodiment cannot understand the ns2 name space, and tries to convert the description of the job ticket by using a dictionary database before normal print processing.

The dictionary database exists in a remote server connected by a computer network, and an interface for using the dictionary database is implemented as a Web service. Data communication by the Web service uses a protocol called SOAP of the XML format. FIG. 13 shows the description of general SOAP. SOAP is made up of two tags: a header and body. A site which provides a target Web service is described in actor in the header. In the body, data to be actually communicated is described in the XML format. A Web service can provide a service by performing a SOAP message exchange process.

Since the printer driver 206 detects in the job ticket the "ns2" name space which cannot be understood by the printer driver 206 (step S602), the printer driver 206 creates SOAP, describes at the header the site of a dictionary database which cooperates with the printer driver, and inserts the job ticket transferred from the application into the body. By transmitting the created SOAP, the printer driver 206 transmits the job ticket to the Web service and issues a conversion request (503 in FIG. 5 and step S603). The printer driver waits in this state until it receives a response to the SOAP from the Web service.

Upon reception of the SOAP containing the job ticket, the Web service running in the server confirms whether its dictionary database has XSLT of the name space contained in the received job ticket (step S604). XSLT is an abbreviation of XSL Translation, is a script language for reading, processing, and outputting an arbitrary XML document, and is described as an XML document. XSLT makes it possible to convert a tag in one-to-one correspondence and also convert only some of nodes in the tree structure of an XML document. By using XSLT, the Web service converts a job ticket having an unknown name space into a job ticket having a known name space. In order to execute XSLT, a program called "XSLT processor" is executed to apply XSLT to an XML document. The Web service holds many XSLT documents in a native XML database. The native XML database is a database which can directly hold data of XML documents, and search and acquisition are done using XPath. XPath is an abbreviation of XMLPathLanguage, and is a standard which defines a description method designating a specific element in an XML document. XPath provides a means for tracking a tree structure representing XML data and accessing all elements and attributes in the XML document.

In order to acquire all XSLT documents corresponding to the "ns2" name space contained in the received job ticket, the Web service inquires XSLT of the dictionary database by describing Xpath as //ns2:*

Upon reception of this XPath expression, the dictionary database of the Web server can acquire all XSLT documents corresponding to the "ns2" name space from the native XML database. As XSLT corresponding to the "ns2" name space, XSLT in FIG. 8 can be acquired from the database (step S605). DocumentStapling as Feature of the "ns2" name space contained in the job ticket of FIG. 7 is converted by XSLT in FIG. 8 into two tags: Staple Feature in a "GANON" name space and StaplePosition Feature in the "GANON" name space. For staple in the "GANON" name space, Value "false" is set if DocumentStapling in the "ns2" name space has OFF Option; otherwise, Value "true" is set. StaplePosition in the "GANON" name space is replaced with another Value in correspondence with each Option name of DocumentStapling in the "ns2" name space. By applying XSLT in FIG. 8 to the job ticket in FIG. 7, a job ticket in FIG. 9 is obtained. The job ticket having tags in the "ns2" name space by an unknown printer driver which is actually used for printing is converted into a job ticket having tags in the "GANON" name space known to the printer driver 206 according to the embodiment, thus inheriting functions (step S606).

Next, attention is given to a job ticket in FIG. 10. Assume that "Inserter" in the "ns2" name space of the job ticket in FIG. 10 cannot be converted even by applying XSLT in FIG. 8. In this case, "Inserter" remains as an unknown tag (step S607). The Web service in the server performs processing for the unknown tag, and encloses the unknown tag by UnKnown Tag in the "GANON" name space. By using Xpath, the Web service searches the dictionary database to acquire Features whose character strings partially match the unknown tag, and lists them as Values. If two Values "InsertionUnit" and "InsertingSheet" are found as similar candidates in the dictionary database, they are inserted into the job ticket (step S609). If an "exact match" conversion result cannot be obtained, the Web service of the server searches for and outputs a character string whose coincidence with characters of a target character string is equal to or larger than a predetermined value.

In this manner, the Web service cooperates with the dictionary database, and converts a job ticket containing an unknown name space into a job ticket having a known name space.

The Web service inserts the converted job ticket into the body of a created SOAP response, and transmits the response to the printer driver (step S608).

The printer driver checks the job ticket received from the Web service, and determines whether an Unknown tag exists in the "GANON" name space. If no UnKnown tag is detected, print processing starts; if an UnKnown tag is detected, the printer driver checks whether to display a UI (User Interface) for prompting the user to select a character string representing a function which cannot be converted by the dictionary database. If no UI is displayed or the user does not select any function on the displayed UI, the driver executes print processing while leaving the unknown job ticket. A general printer driver does not process an unknown job ticket and passes it through.

Figure 14:
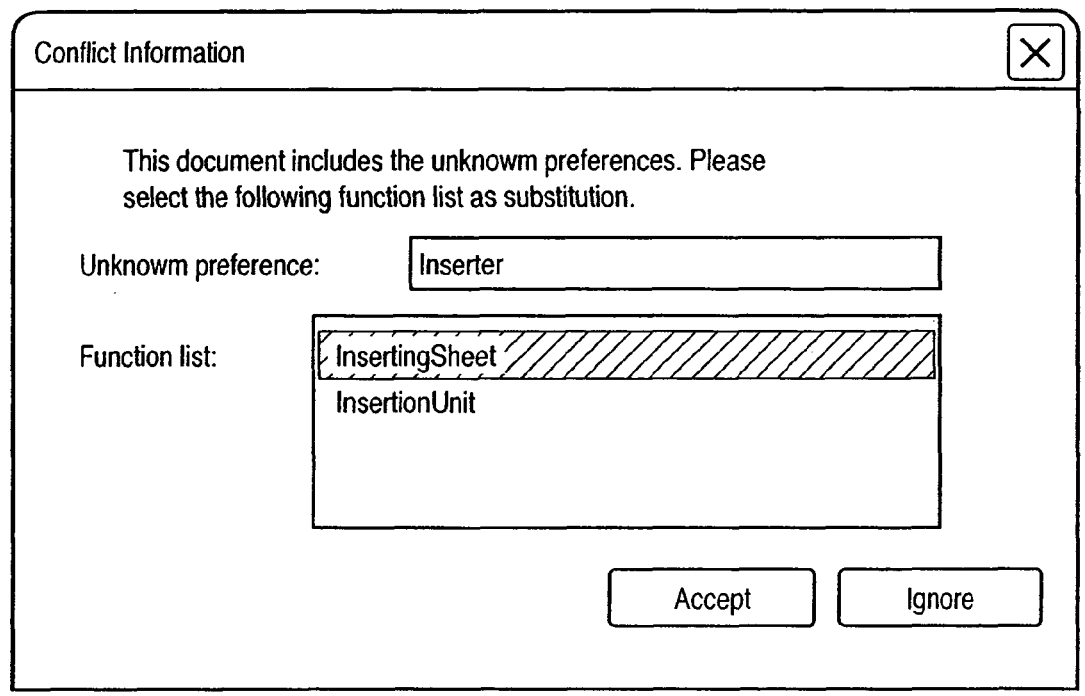
FIG. 14 is a view showing an example of a user selection window displayed by the printer driver according to the embodiment.

If the job ticket sent back from the Web service is assigned with an UnKnown tag for Inserter in the "ns2" name space (step S610), a job ticket shown in FIG. 11 is received from the server, and a setting to display a UI is made, a UI in FIG. 14 is displayed (step S611).

The user is prompted to select either of character strings "InsertingSheet" and "InsertionUnit" representing two functions listed by the Web service, and the unknown tag is converted into the selected function. Assume that the user selects "InsertingSheet" (step S612). Then, Inserter in the unknown "ns2" name space is converted into "InsertingSheet" in the known "GANON" name space (step S613). All tags in the unknown "ns2" contained in the job ticket are converted, the job ticket has only known name spaces, and print processing can be normally performed.

The Web service with the dictionary database also has a function of learning a tag which cannot be converted by XSLT.

Note that the printer driver may be installed as a printer controller in the printer of FIG. 6 or in the host computer of the printer.

A function selected by the user and a function in a converted unknown name space are transmitted from the printer driver 206 to the Web service via a SOAP message (505 in FIG. 5 and step S614). The Web service saves, as a log in the database, a pair of the function selected by the user and the function in the converted name space. If the user selects the same function as a function in the unknown name space by a predetermined number of times (e.g., five times) (step S615), a conversion combination is newly registered as XSLT and saved in the dictionary database. The reason that such a combination is not registered when a function is selected once is that a plurality of similar functions may exist and a proper function may not be determined, or that updating of the database by a user's selection error is prevented.

In this case, the Web service acquires, from the printer driver, information that "Inserter" in the "ns2" name space is linked by the user to "InsertingSheet" in the "GANON" name space. Then, the Web service generates XSLT shown in FIG. 12, and registers it in the dictionary database (step S616).

As a result, print settings of a job ticket containing an unknown name space created by an unknown driver can be converted into those of a job ticket containing a known name space without losing functions set by the user. Even a function which does not exist in the dictionary database can be automatically learned, and the conversion precision can always be improved.

Figure 18:
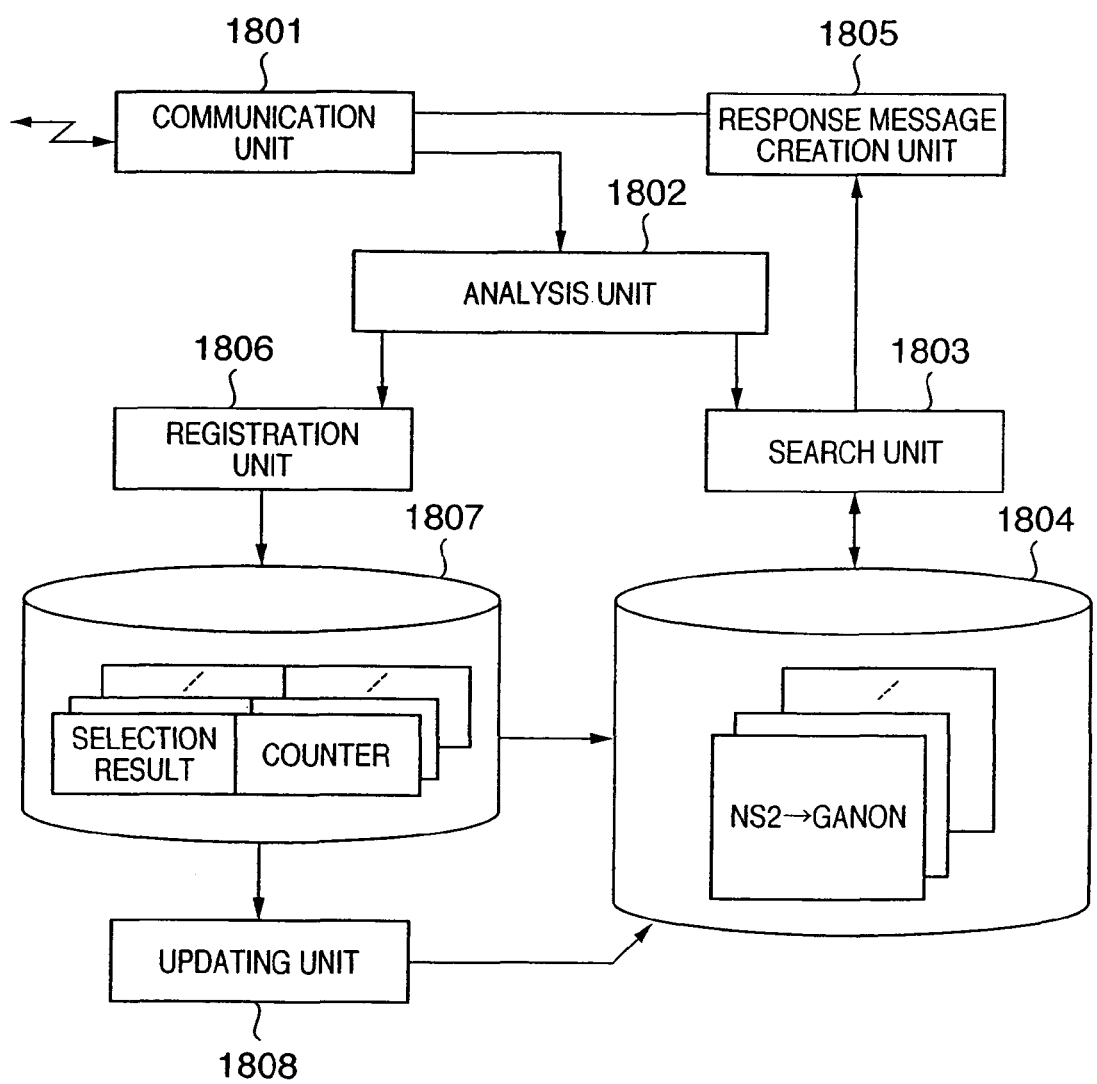
FIG. 18 is a view showing the configuration of a Web server according to the embodiment.

The server which provides the Web service has the same hardware configuration as that in FIG. 1, and a description thereof will be omitted. FIG. 18 shows an example of software and database configurations.

A communication unit 1801 receives a request complying with a SOAP protocol via a network (Internet) from a client (an apparatus in which the printer driver 206 according to the embodiment is installed). An analysis unit 1802 determines whether the request is a request to search for a tag character string in a name space of the own printer driver on the basis of a name space of another printer driver, or a candidate selection result. If the analysis unit 1802 determines that the request is the search request, it notifies a search unit 1803 of a message to this effect. The search unit 1803 searches, for a tag character string which matches a requested function character string, a corresponding table among a plurality of "data tables of conversion from name spaces of printer drivers of other vendors into a GANON name space" stored in a database 1804 (ensured in the HDD). The search unit 1803 sends the search result to a response message creation unit 1805, and the response message creation unit 1805 generates a character string to be sent back to the requesting side. If no "exact match" character string is found, the response message creation unit 1805 creates a response message containing candidate function character strings, as described above. The response message created by the response message creation unit 1805 is sent back to the requesting side.

If the analysis unit 1802 determines that a candidate character string selection result has been received from the client, it transfers the received data to a registration unit 1806. If a function character string is newly selected, the registration unit 1806 newly creates the selection result information in a spare database 1807 (ensured in the HDD), and sets the counter to "1". If the same result as selection result information which has already been registered is received, the registration unit 1806 increments the corresponding counter by "1".

An updating unit 1808 monitors the spare database 1807, and registers a selection result whose counter value has reached a predetermined value (in the embodiment, "5") as authentic data in a corresponding table of the database 1804.

Note that the dictionary database is implemented by the Web service in the above description, but can be held as a pattern file in the printer driver. Instead of automatic learning, the number of job tickets convertible by XSLT can be increased by adding patterns one after another by the manager or developer who maintains the dictionary database.

Figure 19:
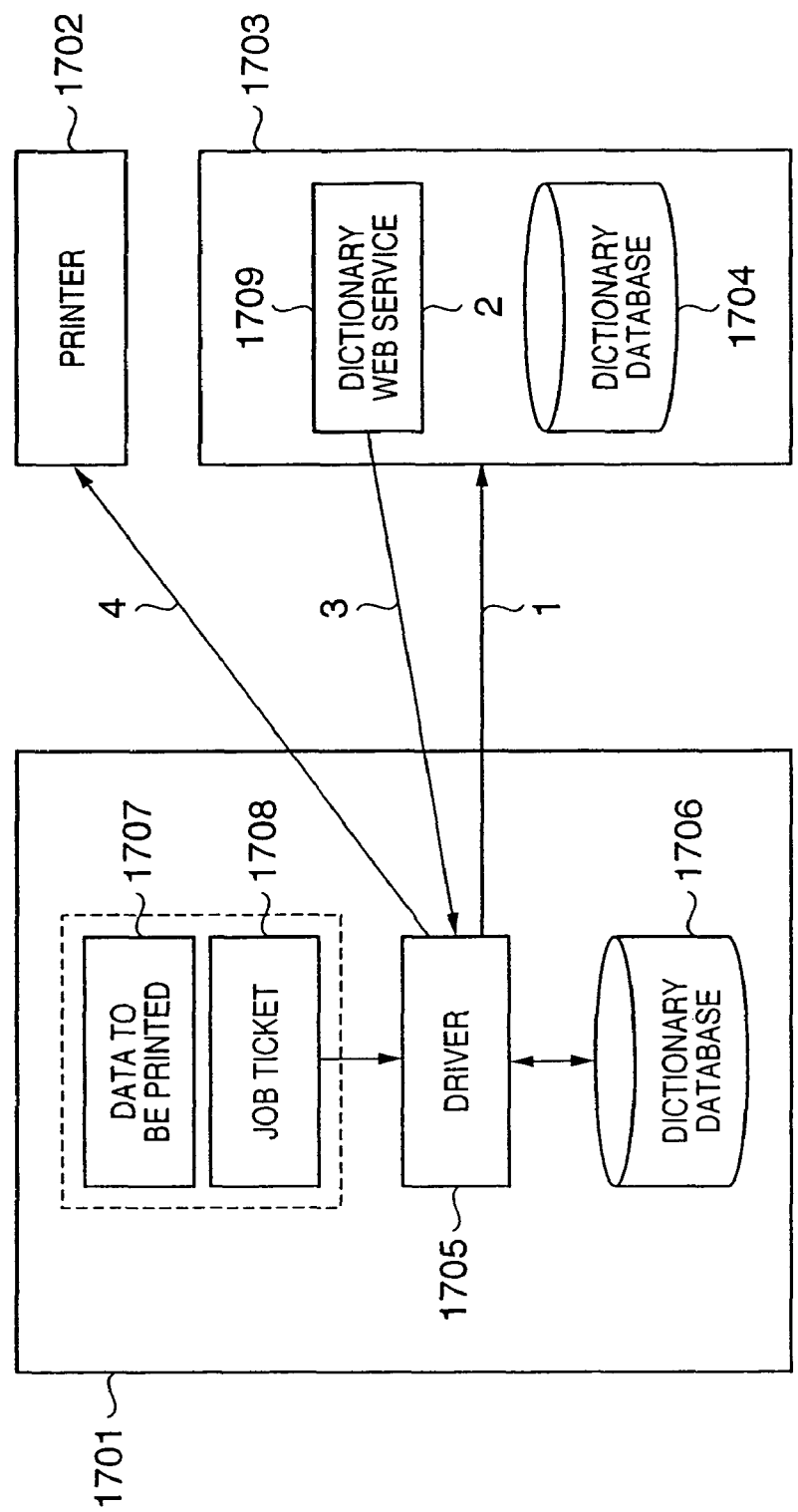
FIG. 19 is a view showing an example of a printing system according to the embodiment.

In FIG. 19, a tag character string which is associated with print settings and cannot be interpreted by a driver 1705 is detected by the driver 1705 from print setting information of a job ticket 1708. The driver 1705 extracts the detected uninterpretable tag character string and transmits it to a computer 1703, or transmits the entire job ticket 1708 containing the uninterpretable tag character string to the computer 1703 in which a dictionary Web service is installed (1). In the computer 1703, a dictionary Web service 1709 refers to a dictionary database 1704, and converts the tag character string uninterpretable by the driver 1705 into a tag character string interpretable by the driver 1705 (2). These processes are the same as those shown in FIG. 6 except that the driver is installed in a printer and the printer inquires an uninterpretable tag character string of the dictionary Web service, or the driver is installed in a computer 1701 and the computer 1701 inquires an uninterpretable tag character string of the dictionary Web service. A job ticket containing a tag character string which is obtained by a series of conversion processes and can be interpreted by the driver 1705 is transmitted from the dictionary Web service in the computer 1703 to the driver 1705. While the print setting information is converted into the binary DEVMODE format or is kept in a text format, the driver 1705 executes necessary image formation processing for data 1707 to be printed by using the transmitted interpretable tag character string, and the driver 1705 transmits the resultant data to a printer 1702. When the data to be printed is application data, the driver 1705 converts the application data into a predetermined printer language. In an image mode, the printer language is converted into a bitmap image. The printer language or bitmap image is transmitted to the printer 1702. In the printer 1702, the bitmap image is processed by the printer controller, and the printer engine finally prints the data on a printing medium such as paper or a CD-ROM.

The dictionary database and dictionary Web service exist in the computer 1703 in FIG. 19, but may exist in the computer 1701, as represented by a dictionary database 1706. In this case, the driver 1705 performs job ticket conversion processing (processing in FIG. 6) by using the dictionary database 1706 without using the dictionary Web service 1709.

The computer 1701 is disclosed which processes the data 1707 to be printed and the job ticket 1708 serving as print setting information used to print the data. The driver 1705 detects a predetermined tag character string as uninterpretable information from the job ticket 1708. The driver controls the OS to transmit the uninterpretable information detected by the driver 1705.

The driver 1705 acquires interpretable information which is sent back in accordance with the transmitted tag character string.

Print setting information is created using the tag character string which is acquired as interpretable information by the driver 1705.

The driver 1705 in the computer 1701 may detect uninterpretable information from a job ticket, and convert into interpretable information a tag character string which is the uninterpretable information detected by the driver 1705.

The above-described function of the driver 1705 in the computer 1701 may be installed in the printer (FIG. 5). The printer in FIG. 5 comprises a printer engine which generates drawing information from data to be printed and prints out by using print setting information and drawing information generated by a renderer.

When uninterpretable information is a character string and no character string is registered in a table in the driver 1705, the driver 1705 may detect, as information uninterpretable by the printer driver, the character string contained in print setting information used to print data.

Uninterpretable information as print setting information used to print target data is received by the dictionary Web service 1709 in FIG. 19. The Web service 1709 converts the acquired uninterpretable information into interpretable information by using XSLT. The Web service 1709 transmits the converted interpretable information.

As described above, according to the embodiment, when print setting information exists in a document ("document" in this case includes not only documents created by a document editing application but also those created by a spreadsheet application, image editing application, and the like) whose printing is designated by an application, and the print setting information is a job ticket (XML format), the function character string is interpreted. When the function character string cannot be interpreted, it is converted into an interpretable string function character by using the dictionary database, and then print settings are performed. Print processing which maintains previously set contents of print settings can be achieved.

As is apparent from the embodiment, a main part of the present invention is characterized by processing of the computer program of the printer driver 206. In general, the computer program is stored in a computer-readable storage medium such as a CD-ROM, and can be executed by copying or installing it in the system. It is, therefore, apparent that the computer program also falls within the scope of the present invention.

As has been described above, according to the present invention, print settings made by another apparatus or system can be inherited to generate print data by using a job ticket having a general-purpose format while each vendor is permitted to extend the description of the job ticket.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2004-224582 filed on Jul. 30, 2004 and 2005-196814 filed on Jul. 5, 2005, which are hereby incorporated by reference herein.

What is claimed is:

1. An information processing apparatus which has printer drivers, wherein the printer driver is selected when an execution of print processing is designated, the selected printer driver processes data to be printed and print setting information described in a markup language used to print the data, and the print setting information includes interpretable information and uninterpretable information as a print setting for a print driver, the apparatus comprising:

a detection unit configured to detect, from the print setting information, uninterpretable information as a print setting for the printer driver, in which the uninterpretable information is designated by a tag in the print setting information;

a transmission unit configured to transmit, to a dictionary service, the uninterpretable information as the print setting detected by said detection unit;

an acquisition unit configured to acquire interpretable information as the print setting for the printer driver, in which the interpretable information is sent back in response to transmission of the uninterpretable information by said transmission unit;

a display unit configured to, when said acquisition unit acquires, as a result of conversion based on the uninterpretable information transmitted by said transmission unit, pieces of interpretable information as a plurality of candidates, display a selection window for selecting one of the pieces of interpretable information;

a creation unit configured to create print setting information by using the interpretable information acquired by said acquisition unit or based on the selection via the selection window;

a generation unit configured to generate a print instruction string from data to be printed; and a sending unit configured to send, to a printing apparatus, print setting information created by said creation unit and the print instruction string generated by said generation unit.

2. The apparatus according to claim 1, wherein said transmission unit transmits the uninterpretable information as the print setting detected by said detection unit to a server apparatus which serves as the dictionary service, and said acquisition unit acquires the interpretable information from the server apparatus.

3. The apparatus according to claim 1, wherein, when printing setting information which has a DEVMODE format is received and is uninterpretable as a print setting for the printer driver, said creation unit creates print setting information using default print setting information.

4. The apparatus according to claim 1, wherein the markup language which describes the print setting information includes XML.

5. The apparatus according to claim 1, wherein the uninterpretable information includes a character string, and when the character string is not registered in the printer driver, said detection unit detects, as information uninterpretable by the printer driver, the character string contained in the print setting information used to print the data.

6. The apparatus according to claim 1, wherein a conversion process executed by the dictionary service is executed using XSLT.

7. The apparatus according to claim 1, wherein, when uninterpretable information detected in the print setting information by said detection unit can be not converted into interpretable information by the dictionary service, the uninterpretable information in the print setting information is enclosed by an unknown tag, which is interpretable for the printer driver.

8. The apparatus according to claim 7, wherein said display unit displays the selection window, for a user, for converting the uninterpretable information enclosed by the unknown tag in the print setting information into interpretable information for the printer driver as the print setting information.

9. A method of processing by an information processing apparatus which has printer drivers, wherein the printer driver is selected when an execution of print processing is designated, the selected printer driver processes data to be printed and print setting information described in a markup language used to print the data, wherein the print setting information includes interpretable information and uninterpretable information as a print setting for a printer driver, the apparatus comprising:
   a detection step of detecting, from the print setting information, uninterpretable information as a print setting for the printer driver, in which the uninterpretable information is designated by a tag in the print setting information;
   a transmission step of transmitting, to a dictionary service, the uninterpretable information as the print setting detected in the detection step;
   an acquisition step of acquiring interpretable information as the print setting for the printer driver, in which the interpretable information is sent back in response to transmission of the uninterpretable information in the transmission step and is described based on the markup language that is the same as said transmission step;
   a display step of displaying configured to, when said acquisition unit acquires, as a result of conversion based on the uninterpretable information transmitted by said transmission unit, pieces of interpretable information as a plurality of candidates, display a selection window for selecting one of the pieces of interpretable information;
   a creation step of creating print setting information by using the interpretable information acquired in the acquisition step or based on the selection via the selection window;
   a generation step of generating a print instruction string from data to be printed; and
   a sending step of sending, to a printing apparatus, print setting information created by said creation step and the print instruction string generated by said generation step.

10. The method according to claim 9, wherein in the transmission step, the information as the print setting detected in the detection step is transmitted to a server apparatus which services as the dictionary service, and interpretable information from the server apparatus is acquired in said acquisition step.

11. The method according to claim 9, wherein, when print setting information which has a DEVMODE format is received and is uninterpretable as a print setting for the printer driver, said print setting information is created in said creation step using default print setting information.

12. The method according to claim 9, wherein the markup language which describes the print setting information includes XML.

13. The method according to claim 9, wherein the uninterpretable information includes a character string, and in the detection step, when the character string is not registered in the printer driver, the character string contained in the print setting information used to print the data is detected as information uninterpretable by the printer driver.

14. The method according to claim 9, further comprising:
   a generation step of generating a print instruction string from data to be printed, and
   a sending step of sending, to a printing apparatus, print setting information created in the creation step and the print instruction string generated in the generation step.

15. The method according to claim 9, wherein a conversion process by the dictionary service processing in said conversion step in the conversion is executed using XSLT.

16. The method according to claim 9, wherein, when uninterpretable information detected in the print setting information in said detection step can be not converted into interpretable information by the dictionary service, the uninterpretable information in the print setting information is enclosed by an unknown tag, which is interpretable for the printer driver.

17. The method according to claim 16, wherein said display step of displaying a selection window, for a user, for converting the uninterpretable information enclosed by the unknown tag in the print setting information into interpretable information for the printer driver as the print setting information.

18. A computer-readable medium storing a computer program executed by an information processing apparatus which has printer drivers, wherein the printer driver is selected when an execution of print processing is designated, the selected printer driver for processing data to be printed and print setting information described in a markup language used to print the data, wherein the print setting information includes interpretable information and uninterpretable information as a print setting for a printer driver, the program comprising:
   a detection step of detecting, from the print setting information, uninterpretable information as a print setting for the printer driver, in which the uninterpretable information is designated by a tag in the print setting information;
   a transmission step of transmitting, to a dictionary service, the uninterpretable information as the print setting detected in the detection step;
   an acquisition step of acquiring interpretable information as the print setting for the printer driver, in which the interpretable information is sent back in response to transmission of the uninterpretable information in the transmission step and is described based on the markup language the same as said transmission step;
   a display step of displaying configured to, when said acquisition unit acquires, as a result of conversion based on the uninterpretable information transmitted by said transmission unit, pieces of interpretable information as a plurality of candidates, display a selection window for selecting one of the pieces of interpretable information;
   a creation step of creating print setting information by using the interpretable information received in the acquisition step or based on the selection via the selection window;
   a generation step of generating a print instruction string from data to be printed; and
   a sending step of sending, to a printing apparatus, print setting information created by said creation step and the print instruction string generated by said generation step.

* * * * *